United States Patent Office 3,293,864
Patented Dec. 27, 1966

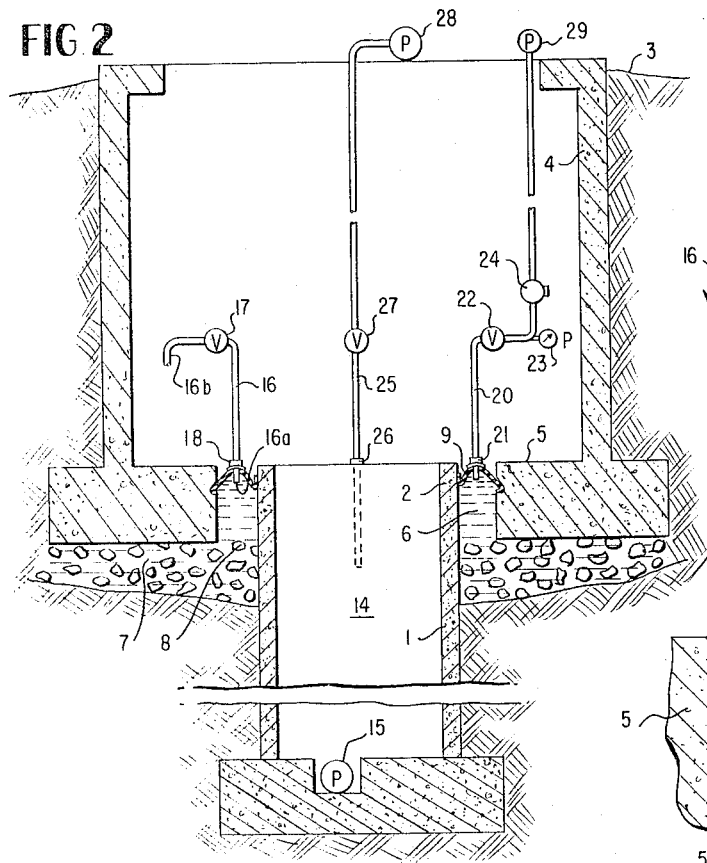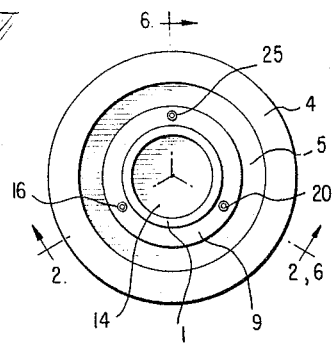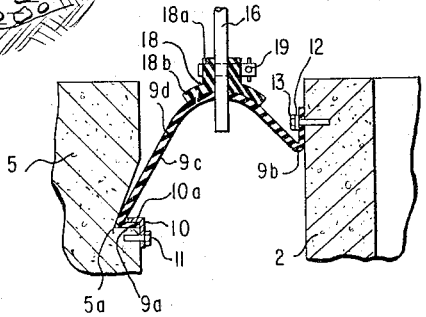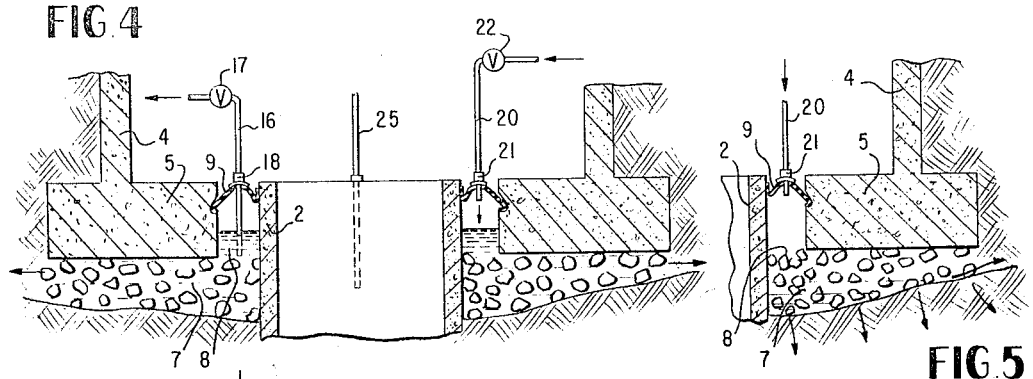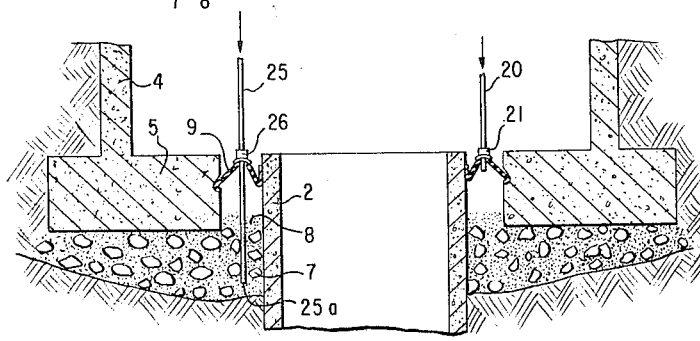

3,293,864
METHOD AND APPARATUS FOR IMPREGNATING MASSES OF MATERIAL
Homer H. Hagius, Price, Utah, and William W. Brown, Duncan, Okla., assignors to Halliburton Company, Duncan, Okla., a corporation of Delaware
Filed Jan. 8, 1964, Ser. No. 336,591
7 Claims. (Cl. 61—36)

This invention pertains to a method and apparatus for impregnating masses of material. In particular, it relates to a uniquely effective, controlled method for injecting grouting fluid into earthen material such as water-saturated backfill adjacent a foundation wall.

In many construction sites there are tendencies for water to accumulate in the vicinity of foundation walls. While a variety of techniques have been employed for controlling the accumulation of such water, these techniques in general have not proven to be wholly effective.

Particular problem involved in water influx control relate to the difficulty in forming effective seals which will prevent water from rising above earthen masses to form freestanding bodies of water. Where water accumulates to this extent, it is difficult to consolidate or seal earthen material because of the freestanding water body as well as the water which saturates the earth. Frequently these adverse conditions of water accumulation are encountered in narrow or confined spaces so as to make working conditions generally awkward.

It is an object of the present invention to provide methods and apparatus which particularly facilitate the impregnating of masses of material which are at least partially saturated with a fluid, the presence of which is not desired.

Specifically, it is an object of the invention to provide an improved method and apparatus which facilitates the grouting of water-impregnated masses of earth.

A further object of the invention is to provide a method and apparatus for injecting grouting material which conveniently and effectively enables the removal of freestanding water and enables the level of fluid in the grouting zone to be controlled.

It is also an object of the invention to provide such a method and apparatus which enables the displacement of water impregnating a mass of material prior to the introduction of grouting fluid.

Yet another object of the invention is to provide such a method and apparatus wherein pressurized gas may be employed to assist in the injection of grouting fluid.

Still another object of the invention is to provide such a method and apparatus which facilitates the injection of grouting material in narrow or confined spaces, and which enables conduits employed for removing water, supplying pressurized air, and supplying grout to be somewhat remote from each other.

In accomplishing the objects of this invention, a material-impregnation method is employed which entails the utilization of pressurized gas to drive fluid within a mass away from its surface. Impregnating material is injected into the mass so as to impregnate at least a portion of the mass formerly occupied by the displaced fluid.

A preferred apparatus which may be used in the practice of this invention comprises barrier means defining an enclosed space above the surface of the mass to be impregnated. First conduit means intersect a portion of this barrier means. This first conduit means is adapted to permit the withdrawal of fluid from the enclosed space. Second conduit means intersect a portion of the barrier. Means are included for supplying pressurized gas to this second conduit means for transmission to the enclosed space. Third conduit means intersect a portion of the barrier means. Means are made available for supplying pressurized material to the third conduit means for impregnating the mass of material.

In practicing the method invention in its preferred and most efficacious form in a grouting operation, freestanding water, above a mass of earthen material to be grouted, is first removed by the aforesaid first conduit means. The pressure of gas injected into the enclosed space, which gas ordinarily would comprise air, is appropriately regulated so as to facilitate the driving of impregnating material into the formation without adversely impeding the flow of grouting fluid through the aforesaid third conduit means. An additional, unique feature of the method invention resides in the manner in which the first conduit means may be employed to control the level of fluid within the enclosed space throughout the grouting operation.

In describing the invention, reference will be made to preferred embodiments illustrated in the accompanying drawings.

In these drawings:

FIGURE 1 is a schematic, plan view of an installation including an annular zone between foundation walls, which zone is to be grouted for the purpose of controlling water accumulation;

FIGURE 2 is an enlarged, elevational view of the FIGURE 1 installation as viewed along the section line 2—2 of FIGURE 1;

FIGURE 3 is a fragmentary, further enlarged, sectional, and elevational view of a portion of the FIGURE 1 installation showing the manner in which a conduit may be secured to a flexible barrier wall for selective, axial adjustment;

FIGURE 4 is a schematic, sectional, and elevational representation of the FIGURE 1 installation as viewed along the section line 2—2, showing a manner in which freestanding water may be withdrawn from an annular space between foundation walls;

FIGURE 5 is a fragmentary, sectional, and elevational view of a portion of the FIGURE 1 installation showing the manner in which pressurized gas may be used to displace water away from the surface of a mass of earthen material to be grouted; and FIGURE 6 provides a schematic, sectional, and elevational view of the FIGURE 1 installation, as viewed along the section line 6—6, showing the injection of grouting fluid into earthen material between foundation walls.

FIGURES 1 through 6 schematically illustrate a representative installation where this invention may be readily practiced.

The installation in question includes a first, generally annular and vertically extending inner wall 1. As illustrated, wall 1 may comprise a concrete, well-like structure, extending downwardly into the earth and having a top 2 disposed beneath an earth surface 3.

A second, or outer, wall 4 extends generally vertically downwardly from the earth surface 3 and terminates at a wall base 5 lying generally adjacent the upper end 2 of the inner wall 1.

As illustrated, the lower end 5 of wall 4 is spaced somewhat outwardly from the upper end 2 of inner wall 1.

With the upper end 2 of inner wall 1 and the lower end 5 of outer wall 4 being disposed substantially beneath the ground surface 3, there may be a tendency for ground water or water from other sources to accumulate in the annular zone 6 between the walls 1 and 4. This tendency toward water accumulation may be particularly pronounced owing to the relatively unconsolidated character of the backfill, earthen material 7 which would ordinarily be positioned between the wall 1 and the wall 4 in following conventional construction practices.

The tendency toward water accumulation may be so pronounced that freestanding water may tend to accumulate above the surface 8 of the backfill 7 in the annular space 6.

A known expedient for attempting to control the accumulation of water in the annular space 6 involves the installation of a flexible membrane or wall 9 extending generally transversely across the upper portion of the space 6. Flexible wall 9 may be fabricated of elastomeric material such as rubber or neoprene and may be reinforced by imbedded fabric or other material.

As shown in FIGURE 3, one end 9a of flexible wall 9 may be secured to the base 5 of the outer wall 4 by a conventional clamping arrangement compresing generally L-shaped plate means 10. Plate means 10 may be secured to wall base 5 by conventional bolt means 11 as shown. If desired, bolts may also be passed through flange portion 10a of the plate means to more positively secure the flexible wall edge 9a to the recessed surface 5a of the wall base 5.

The outer edge 9b of the flexible wall 9 may be joined to the upper end 2 of the wall 1 by conventional securing means comprising retaining plates 12 and securing bolts 13, as schematically shown in FIGURE 3.

In the installation shown in FIGURES 1 through 6, the flexible wall 9, which lies above and is spaced from the surface 8 of the backfill 7, is frequently termed a "water-stop bulb."

In practice it has been found that the flexible wall 9 may not satisfactorily prevent accumulated water from rising upwardly in the annular space 6 and overflowing the upper edge 2 of the inner wall 1 and flowing into the base of the well-like cavity 14. Under particularly adverse circumstances, even the employment of a pump 15 in the base of the cellar 14 may fail to maintain requisite conditions of dryness.

Where particularly extreme conditions of water influx are encountered, this invention provides an effective concept for withdrawing accumulated water and impeding an additional influx of water into the annular space 6 between the walls 1 and 4. In practicing this technique, barrier means above the surface 8, defined by the inner surface 5b of wall 4, the outer surface 1a of wall 1, and the lower surface 9c of flexible wall 9, are utilized to the extent that they define the enclosed space 6 above the earthen surface 8. This enclosed space is employed as a reservoir for pressurized gas, ordinarily pressurized air, in a fashion to be hereinafter described so as to enable the accomplishment of a uniquely controlled grouting operation under adverse conditions of water accumulation.

In accomplishing the grouting operation, three conduit systems are employed which intersect and extend generally vertically through the flexible wall 9.

One such conduit system includes a conduit 16 and an associated flow-control valve 17. Conduit 16 extends generally vertically through the wall 9 and is sealingly connected to the wall 9 by a stuffing box or slip joint type of coupling 18. As shown schematically in FIGURE 3, slip joint coupling 18 may comprise a flanged cylinder made of elastomeric material such as neoprene. Flange portion 18a of this coupling may be secured by a conventional, commercially available, resin-based adhesive, to the upper surface 9d of the wall 9. Conventional, releasable clamping means such as the schematically shown hose clamp 19, which circumscribes the cylindrical portion 18b of coupling 18, may be employed to secure the conduit 16 at a desired position of axial adjustment. As illustrated, conduit 16 passes coaxially through coupling portion 18b. By merely loosening the clamp 19, the conduit 16 may axially and vertically be moved so that the free and open end 16a of the conduit 16 may be positioned at any desired elevation within the annular space 6.

Second conduit means comprising a tubular conduit 20 may be employed for injecting pressurized air into the annular space 6. As shown in FIGURE 2, conduit 20 intersects and extends generally vertically through flexible wall 9 so as to terminate with its open end 20a within the annular space 6. If desired, a coupling 21, similar to the coupling 18, may be employed to sealingly interconnect the conduit 20 with the wall 9.

In order to control and monitor the flow of air through conduit 20, conventional flow-regulating means such as control valve 22, pressure gauge 23, and air pressure regulator 24 may be employed.

Third conduit means, through which grouting fluid is to be injected into the earthen mass 7, includes a generally tubular conduit 25.

As shown in FIGURES 2 and 6, tubular conduit 25 extends generally vertically through wall 9 and has a lower free end 25a disposed within the interior of the earthen mass 7 below the surface 8. Conduit 25 may be sealingly interconnected with the wall 9 by a coupling 26 generally corresponding to the couplings 18 and 21. A conventional flow control valve 27 may be incorporated with the conduit 25 so as to provide appropriate means for controlling the flow of grouting fluid into the mass 7.

As will be apparent from the illustrations, and by the subsequent description of the manner in which this invention is practiced, the utilization of the enclosed space 6 above the mass 7 to be grouted enables the various conduit components of the apparatus to be positioned at mutually spaced and even somewhat remote locations.

In the practice of the invention, freestanding water in the space 6 is first removed. At least a substantial portion of this freestanding water is removed through the conduit 16. The removal of freestanding water from the space 6, upwardly through the conduit 16 under the influence of pressurized air introduced into the space 6 through the conduit 20, is illustrated in FIGURE 4.

In order to effect the removal of freestanding water from the space 6, the free and open end 16a of the conduit 16 is disposed at a desired elevational position with respect to the surface 8. This positioning, of course, is accomplished by moving the conduit 16 axially through the coupling 18 and wall 9. With the conduit end 16a positioned as desired, water may be removed from the space 6 by supplying pressurized air through the conduit 20 to the space 6. Such pressurized air may be supplied by conventional, schematically illustrated air pump means 28. The pressure within the space 6, created by the introduction of pressurized air, will force freestanding water into the end 16a of the conduit and vertically upwardly through the conduit 16 and away from the mass 7. This transportation of freestanding water away from the mass 7 may also be accomplished by utilizing the conduit 16 as a siphon or by connecting the upper end 16b of the conduit 16 to conventional pump means.

As will be apparent, the positioning of the end 16a of the conduit 16 will determine the level, if any, of residual water remaining within the space 6 after the free-water-removal operation described above.

Before initiating the grouting operation, it may be desirable to determine the upper level of free water standing within the space 6. This may be accomplished by lowering the conduit 16 into the space 6 while pressurized air is being introduced into this space through the conduit 20. When it is detected that the flow of pressurized air upwardly through the conduit 16 changes to a flow of water, the lower end 16a of the conduit 16 will have reached the interface defined by the upper surface of the freestanding water within the space 6 which lies, of course, immediately beneath the pressurized air.

After at least the bulk of the freestanding water has been removed from the space 6 through the tubular conduit 16, water may then be driven into the interior of the mass 7 and generally away from the surface 8 which extends across the top of the mass 7 between the wall surface 1a and 5b.

By thus displacing water impregnating the earthen mass 7 from the vicinity of the annular space 6 between the inner wall 1 and the outer wall 4 and also possibly from the backfill zone underlying the base 5, a void condition will be created conducive to the effective injection of grouting material.

The displacement of water impregnating the mass 7 away from the surface 8 is accomplished by injecting pressurized air through the conduit 20. As shown in FIGURE 5, this injection of pressurized air drives water away from the surface 8 and into the interior of the earthen mass 7 toward the outside of the base 5 and possibly into permeable zones underlying the mass 7.

With impregnating water having been driven away from the space between the walls 1 and 4, the injection of grouting fluid through the conduit 25 may be commenced. As shown in FIGURE 6, grouting fluid is flowed under pressure through the conduit 25 and is injected directly into the interior of the mass 7. Such pressurized grouting fluid may be supplied by conventional, schematically illustrated, slurry pump means 29.

A variety of grouting fluids may be employed to consolidate the earthen mass 7 and provide an effective fluid seal between the walls 1 and 4. Conventional grouting fluid which may be employed for this purpose may comprise a cementatious slurry, a gelling grout, or a chemical grout. The particular grout selected, of course, will deepnd upon the environmental conditions at the work site.

While grouting fluid is entering the mass 7, air pressure may be maintained at a desired level above the surface 8 within the space 6. This maintenance of properly regulated and controlled air pressure serves to prevent the return of displaced water prior to the completion of the grouting operation and facilitates the driving of grouting fluid deeply and more uniformly into the interior of the mass 7.

In order to facilitate the flow of grouting fluid from the conduit 25 into the interior of the mass 7 at a desired rate, it may become desirable to reduce the pressure of air occupying the annular space 6 above the earthen mass surface 8. This reduction in air pressure may be accomplished by opening the valve 17, which had previously been closed at the conclusion of the free-water-removal step. This will allow an outflow of pressurized air through the conduit 16 until an appropriate pressure reduction has been obtained.

It is desirable to provide means for insuring that an excessive amount of grouting fluid is not injected into the mass 7 so as to overfill the annular space 6 and tend to disrupt the seals between the flexible wall 9 and the walls 1 or 4. This monitoring on the level of grout may be accomplished by utilizing the conduit 16. The conduit 16 may be moved axially through the coupling 18 until the free and open end 16a is positioned at the desired maximum elevation of grouting fluid. With the end 16b of the conduit open, and with the valve 17 open, an observer may readily detect when the flow of pressurized air through the conduit 16 is affected. The air flow, of course, will be interrupted as grouting fluid arrives at the level of the conduit end 16a. It would also be possible to selectively move the tube 16 during the grouting operation to determine the point at which air flow commenced or ceased, depending upon the direction of tube movement, so as to ascertain the level of grouting fluid within the space 6 at any point during the grouting operation.

After the desired amount of grouting fluid has been injected into the mass 7, and the flow valve 27 closed, air pressure may be maintained within the space 6 to insure the setting or solidifying of the grouting fluid. This will tend to insure the formation of a uniformly effective grouting seal and prevent the return of water into the annular zone 6 before the formation of the grouting seal has been perfected.

In describing the invention, reference has been made to schematically illustrated conduit systems with only one conduit having been shown for each of the water removal, air injection, and grouting fluid injection portions of the system. It will be understood that multiple conduits may be employed for each of these portions of the system and that the conduit arrangements may differ substantially from the symmetrical arrangement illustrated in the drawings. It will likewise be appreciated that the invention, in its widest scope, is not limited to the specific, grouting application described or to the specifically described sequence of manipulative operations.

In describing preferred embodiments of the method and apparatus, advantages of this invention have been demonstrated. Particular control advantages may be ascribed to the utilization of the enclosed space above the mass of material to be grouted, in combination with the creation of a controlled pressure body of gas above this mass. This concept enables the effective removal of water from the grouting zone, facilitates the controlled injection of grouting fluid, and permits the setting of grouting fluid prior to the return of water to the grouting zone.

The utilization of axially movable conduit as a water-removal mechanism, as a fluid level control mechanism, and as a fluid level determining device, affords particular control advantages in practicing the invention and provides convenient means for removing freestanding water.

The overall system is such as to enable substantial flexibility in the disposition and operation of individual system components and enables the utilization of these components under adverse working conditions where working space is at a premium. Even though the various system components are cooperatively and functionally unrelated, they may be relatively remotely disposed in relation to each other.

Addtional advantages relate to the manner in which an existing water-stop seal is effectively employed as an adjunct to a grouting operation. Also noteworthy is the relatively simple, but effective slip joint structure, used to sealingly connect conduits to the water stop seal. This coupling may be attached to an existing water stop with minimum effort and with minimum effect on the overall seal.

A particular advantage of the invention resides in the structural simplicity which characterizes the system but which simultaneously affords positive and reliable control over a grouting operation.

Those skilled in the art may recognize additions, deletions, substitutions, and modifications which may be made with respect to the disclosed method and apparatus embodiments, but which would lie within the purview of the invention as defined in the appended claims.

We claim:
1. A method of grouting water impregnated, earthen material, said method comprising:
   transporting at least a portion of water, standing above an exposed surface of an earthen mass, away from said mass;
   releasing pressurized air into an enclosed space above said exposed surface of said earthen mass away from which water has been transported so as to apply pressurized air directly to said surface, said air being under sufficient pressure to drive water within said earthen mass away from said surface and into the interior of said earthen mass; and
   injecting grouting fluid into said mass to impregnate at least a portion of said mass formerly occupied by said water.

2. A method as described in claim 1 wherein:
   pressurized air is initially supplied to said enclosed space at a relatively high pressure sufficient to drive said water away from said surface; and
   pressurized air is supplied to said enclosed space at a relatively lower but superambient pressure while said grouting fluid is being injected into said earthen mass.

3. A method of impregnating masses of material, said method comprising:

transporting at least a portion of fluid standing above an exposed surface of a mass of material away from said mass;

releasing pressurized gas into an enclosed space above said exposed surface of said mass of material away from which said fluid has been transported so as to apply pressurized gas directly to said surface of said mass of material, said gas being under sufficient pressure to drive fluid within said mass away from said exposed surface and into the interior of said mass; and injecting material into said mass to impregnate at least a portion of said mass formerly occupied by said fluid.

4. A method as described in claim 2 wherein pressurized air is allowed to flow away from said mass of earthen material so as to control the pressure of air adjacent said mass of material during the injection of grouting fluid into said mass.

5. An apparatus for grouting water impregnated, earthen material, said apparatus comprising:

first, generally vertically extending, wall means;

second wall means encircling and laterally spaced from first wall means;

third, flexible, wall means extending generally laterally between said first and second wall means and spaced above a portion of a mass of earthen material lying between said first and second wall means;

first, valved conduit means intersecting said third, flexible, wall means in sealed relationship therewith;

coupling means between said first conduit means and said third, flexible, wall means, with said first conduit means being mounted for selective axial movement in said coupling means;

said first conduit means being adapted to withdraw fluid from the space between said first and second wall means;

second, valved conduit means intersecting said third flexible wall means in sealed relationship therewith;

means for supplying pressurized air to said second conduit means for transmission to the space between said first and second wall means;

third, valved conduit means intersecting said third flexible wall means; and means for supplying pressurized grouting fluid to said third conduit means for injection into said earthen mass.

6. An apparatus as described in claim 5 wherein said coupling means between said first conduit means and said third, flexible wall means comprises a flanged, elastomeric cylinder with a flange portion thereof being adhesively bonded to the upper surface of said third flexible wall means, said coupling further including releasable clamp means circumscribing a cylindrical portion of said coupling, with said first conduit means passing axially through said cylindrical portion.

7. An apparatus for impregnating a mass of material, said apparatus comprising:

barrier means defining an enclosed space above the surface of said mass;

first conduit means intersecting a portion of said barrier means;

said first conduit means being adapted to withdraw fluid from said space;

second conduit means intersecting a portion of said barrier and having an outlet opening in said space;

means for supplying pressurized gas to said second conduit means for transmission to said space;

third conduit means intersecting a portion of said barrier means and having an outlet opening within said material; and means for supplying pressurized material to said third conduit means for impregnating said mass of material.

References Cited by the Examiner

UNITED STATES PATENTS

| | | | |
|---|---|---|---|
| 695,583 | 3/1902 | Schietkiewics | 61—36 |
| 941,087 | 11/1909 | Moore | 61—40 |
| 1,952,162 | 3/1934 | Gee et al. | 61—36 |
| 2,021,014 | 11/1935 | Moran | 61—81 |

CHARLES E. O'CONNELL, *Primary Examiner.*

JACOB SHAPIRO, *Examiner.*